(12) United States Patent
Asakawa et al.

(10) Patent No.: US 8,132,099 B2
(45) Date of Patent: Mar. 6, 2012

(54) METHOD FOR OBTAINING ACCESSIBILITY INFORMATION, COMPUTER PROGRAM AND ACCESSIBILITY INFORMATION DEVICE

(75) Inventors: Chieko Asakawa, Yokohama (JP); Hisashi Miyashita, Machida (JP); Daisuke Sato, Yamato (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 12/238,787

(22) Filed: Sep. 26, 2008

(65) Prior Publication Data

US 2009/0100328 A1   Apr. 16, 2009

(30) Foreign Application Priority Data

Oct. 11, 2007   (JP) .................................. 2007-265234

(51) Int. Cl.
*G06F 15/16*   (2006.01)
(52) U.S. Cl. ....................................................... 715/271
(58) Field of Classification Search ................... 715/271
See application file for complete search history.

(56) References Cited

U.S. PATENT DOCUMENTS

2002/0178007 A1* 11/2002 Slotznick et al. .......... 704/270.1
2006/0184639 A1*  8/2006 Chua et al. .................... 709/217
2006/0277044 A1* 12/2006 McKay ......................... 704/260

OTHER PUBLICATIONS

Microsoft Corporation, "Microsoft Active Accessibility", from internet archive on Dec. 5, 2006, http://web.archive.org/web/20061205093347/http://msdn2.microsoft.com/en-us/library/ms697707.aspx, p. 1.

* cited by examiner

*Primary Examiner* — Doug Hutton, Jr.
*Assistant Examiner* — Andrew McIntosh
(74) *Attorney, Agent, or Firm* — Vazken Alexanian

(57) ABSTRACT

A method and apparatus for obtaining accessibility information in content of a rich internet application. The method for obtaining accessibility information includes executing an object of the content displayed on a display screen, estimating a role of the object using reference model information prepared beforehand concerning a plurality of objects, and outputting the estimated role of the object as the accessibility information. Therefore, even when the object does not have accessibility information, the accessibility information can be obtained based on the output during the execution and the internal state. In this way, it is possible for a visually impaired user to operate rich internet applications that are created by Dynamic HTML and Flash™.

18 Claims, 18 Drawing Sheets

FLOWCHART OF THE PROCESSING FOR ESTIMATING ALTERNATIVE TEXT OF AN OBJECT

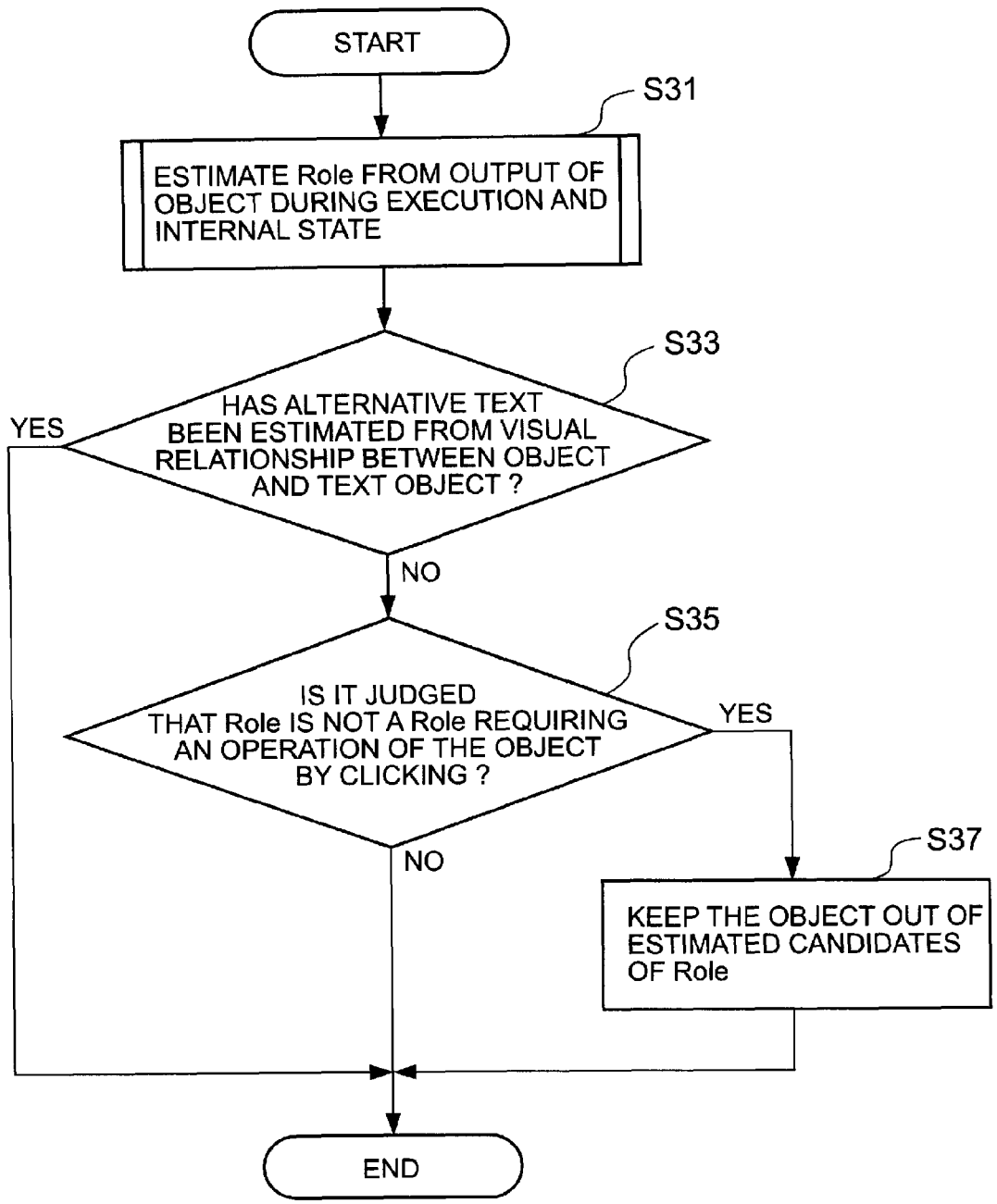

FIG. 15

×O△1:Home
http://www.×O△1.com/corp/

| Output | | Status |
|---|---|---|
| Before | After | |
| — | View the Company Fact Sheet Button | $T_1$ |
| 8 Button | thumb2 Button | $X_1$ |
| 9 Button | thumb3 Button | $X_2$ |
| 10 Button | thumb4 Button | $X_3$ |
| 11 Button | thumb5 Button | $X_4$ |
| — | O△ × Button | $T_2$ |
| — | □×O OFFICE Button | $T_3$ |
| — | ×O△1 CABLE Button | $T_4$ |
| — | ×△□ CINEMA Button | $T_5$ |
| — | OOO △△△ ××× Button | $T_6$ |
| — | O×△ INC. Button | $T_7$ |
| — | △△△ ENTERTAINMENT Button | $T_8$ |

O△□2-Videos
http://O△□2.go.com/fairies/movies/videos.html

| Output | | Status |
|---|---|---|
| Before | After | |
| 4 Button | Meet the Fairies Button | $T_1$ |
| 7 Button | Books Button | $T_2$ |
| 9 Button | Movies Button | $T_3$ |
| Movies Button | Movies Button | — |
| 24 Button | Games & Activities Button | $T_4$ |
| 28 Button | Create a Fairy Button | $T_5$ |
| Home Button | Home Button | — |
| 34 Button | Parents Button | $T_6$ |
| 41 Button | Videos Button | $T_7$ |
| 42 Button | Photo Gallery Button | $T_8$ |
| 43 Button | Hisotry Button | $T_9$ |
| 44 Button | Pause Button | $N_1$ |
| 45 Button (Unnecessary) | handle Button | $X_1$ |
| 47 Button | Rewind Button | $N_2$ |
| 50 Button | SoundController Button | $N_3$ |
| Send to a friend Button | Send to a friend Button | — |
| 53 Button | item_1 Button | $X_2$ |
| 56 Button | item_2 Button | $X_3$ |
| 58 Button | item_3 Button | $X_4$ |

| Status | |
|---|---|
| Tn: | Repaired with Text |
| Nn: | Reparired with Instance Name |
| Xn: | Not Repaired |

FIG. 16

| Page Title | ×○△1:Home | | ○△□2-Videos | |
|---|---|---|---|---|
| | Before | After | Before | After |
| (1) Total Buttons | 4 | 12 | 19 | 19 |
| (2) Not Exposed Buttons | 8 | 0 | 0 | 0 |
| (3) Unnecessary Buttons | 0 | 0 | 1 | 1 |
| (4) Buttons with Invalid Alternative Text | 12 | 4 | 15 | 3 |

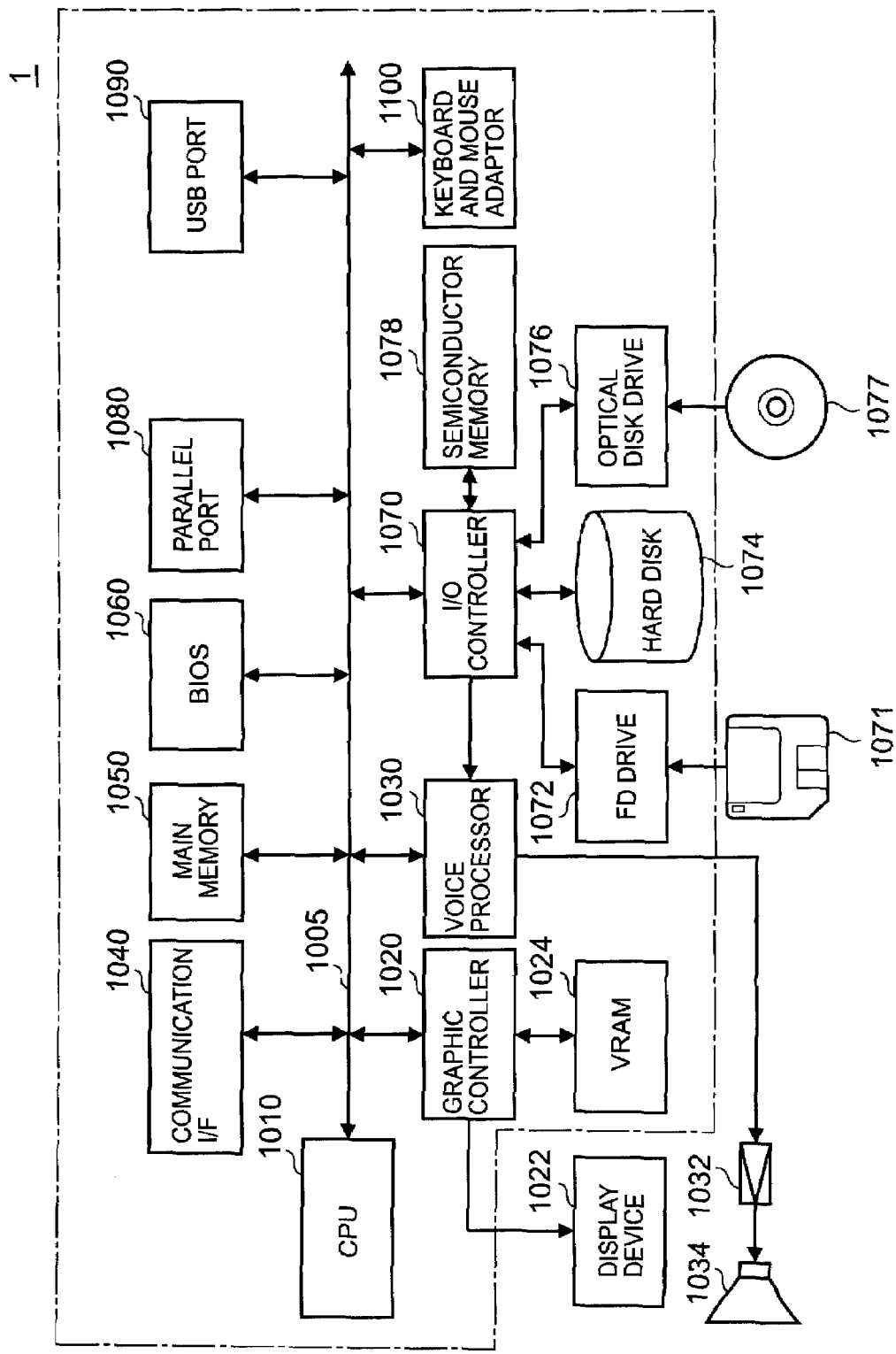

METHOD FOR OBTAINING ACCESSIBILITY INFORMATION, COMPUTER PROGRAM AND ACCESSIBILITY INFORMATION DEVICE

CROSS-REFERENCE TO RELATED APPLICATION

This application claims priority under 35 U.S.C. §119 from Japanese Patent Application No. 2007265234 filed Oct. 11, 2007, the entire contents of which are incorporated by reference herein.

BACKGROUND OF THE INVENTION

1. Field of the Invention

The present invention relates to a method for obtaining accessibility information in the content of a rich internet application, and more particularly relates to a computer program and an accessibility information device.

2. Description of the Related Art

In recent years, rich internet applications (RIA) as represented by Flash™ and Dynamic HTML (DHTML) have greatly increased in number. Due to the sudden rise of Ajax (Asynchronous JavaScript™+XML), DHTML is being actively used in many Web applications. Furthermore, Flash™, which displayed simple animations in 1996, has been installed in 98% or more computers during the following 10 years. Flash™ provides components for voice output, script-based user interaction, and GUI (Graphical User Interface), handles high level graphic processing functions, streaming moving images, and has established its position as a platform for providing interactive content.

In this way, while RIA is being actively applied on the Web, the importance of accessibility is increasing. However, in RIA such as DHTML and Flash™, (1) information is often represented by images instead of text because importance is placed on visual effects (in such a case, alternative text is often not provided, which plays a role as a comment on the image information); (2) since ESMAScript as a standard specification of Javascript™ is used for designing a user interface, presentation is limited by a script. Therefore, it is difficult to understand what a Role a respective object of content has.

In DHTML, an effort to establish a standard called WAI-ARIA (http://www.w3.org/TR/aria-roadmap/) has started, by which a framework for securing accessibility is becoming established. However, according to WAI-ARIA, a creator of content has to assign information such as Role and State as needed using a script. In the present circumstances, however, there is little WAI-ARIA compliant content available.

A mechanism for accessibility is prepared for Flash™ as well, and a method is prepared which provides information on Role and State using a mechanism called MSAA (Microsoft™ Active Accessibility) (see http://msdn2.microsoft.com/en-us/library/ms697707.aspx). In reality, however, there has not been enough effort made to handle the accessibility of Flash™. Thus, most of Flash™ content on the Internet is not accessible, so that it is almost impossible for a visually impaired user to operate such content, when he/she accesses the content using a screen reader reading aloud the content on a screen.

SUMMARY OF THE INVENTION

In this way, content is often not accessible in RIA, which has been caused mainly by the following three problems. First, with regard to an object, information on Role and State of buttons and links, is not correctly provided. Second, alternative text is not provided. Third, since content is provided as scripts, it is difficult to find out accessibility problems and to recover the same.

It is an object of the present invention to provide a method for obtaining accessibility information in the content of a rich internet application and to provide a computer program and an accessibility information device.

According to one aspect of the present invention, the following solving means is provided.

According to a first embodiment of the present invention, a method for obtaining accessibility information in the content of a rich internet application is provided. According to the method for obtaining accessibility information, an object of the content displayed on a display screen is executed in an experimental environment. Then, in accordance with output information output from the object when the object is executed and a state of the object, a role of the object is estimated using reference model information prepared beforehand concerning a plurality of objects. The state of the object outputs the estimated role of the object as the accessibility information. The output is conducted with respect to an internal model. Herein, the rich internet application is created by using any one of Flash™ and Dynamic HTML.

According to a second embodiment of the present invention, in accordance with a positional relationship between the object and a text object displayed in the vicinity of the object, the text object is estimated as alternative text representing the object. As for the positional relationship, a size of the object is measured, and in accordance with whether the size of the object is zero or not, a text object satisfying a predetermined conditional expression is estimated as the alternative text. Further, if any alternative text is not estimated based on the positional relationship, symbol information allocated to the object is estimated as the alternative text, the symbol information being obtained from a program forming the content when the object is executed in the experimental environment.

According to a third embodiment of the present invention, in the case where the role of the object is estimated but the alternative text is not estimated, a size of the object is measured, and if the size of the object satisfies a predetermined dimension, the role of the object is judged. Then, in accordance with the judgment result, the estimation that has been already made concerning the role of the object is cancelled.

According to a fourth embodiment of the present invention, the role of the object is estimated as a result of various verifications. The experimental environment is initialized, a state of the object is recorded, the recorded state of the object and a state of the reference model information are compared, a state corresponding to a transition that may occur following the compared reference model information is acquired, output information in the acquired state of the reference model information and the output information output from the object when the object is executed are verified, and a role of the object is estimated based on the reference model information in accordance with a result of the verification. Alternatively, concerning the execution of the object, the experimental environment is saved before executing the object, when an input of the object is sent out, a state of the object is recorded, and after executing the object, the experimental environment is restored. Further, it is verified whether the output information of the object executed contains the output information of the acquired reference model information or not.

As other aspects of the present invention, the present invention can be provided as a computer program executed in a computer and an accessibility information acquisition device.

The advantages of the present invention are as follows.

First, in accordance with output information output from an object of content displayed on a display screen when the object is executed in an experimental environment and a state of the object, a role of the object is estimated using reference model information prepared beforehand concerning a plurality of objects. Therefore, even when the object does not have accessibility information, the accessibility information can be obtained based on the output during the execution and the internal state. Further, the output is conducted with respect to an internal model, and therefore accessibility information can be output as voice using the internal model, from which useful information for a visually impaired user can be obtained. Moreover, accessibility information can be input beforehand using an internal model when content is created.

Second, in accordance with a positional relationship between the object and a text object displayed in the vicinity of the object, the text object can be estimated as alternative text representing the object. Therefore, even when the object does not have accessibility information, the accessibility information can be obtained by estimating alternative text based on the object and the text object. Further, the accessibility information can be obtained with consideration given to the case where the size of the object is zero. Moreover, symbol information of the object can be obtained from a program by executing the object in the experimental environment. This symbol information can be estimated as the alternative text of the object, and therefore accessibility information representing the object can be obtained.

Third, if any alternative text is not estimated for the role of the object, a size of the object is measured, and if the size of the object satisfies a predetermined dimension, the role of the object is judged. Then, in accordance with the judgment result, the estimation that has already been made concerning the role of the object is cancelled. That is, among the roles of the object estimated by mistake, a specific one can be cancelled by a predetermined processing. Therefore, an error in the estimation can be reduced.

Fourth, the estimation for the role of the object can be verified by a verification processing of executing the object in an experimental environment and using a reference model. Thus, the correctness of the estimated object role can be confirmed. Since the role is output as the accessibility information, the successful ratio of obtaining useful accessibility information for users can be improved.

According to the present invention, alternative text and a role of an object are estimated in content of rich internet application and the estimated alternative text and role are utilized, whereby a method for obtaining accessibility information, a computer program and an accessibility information device can be provided.

BRIEF DESCRIPTION OF THE DRAWINGS

FIG. 4 is a flowchart of the processing for estimating Role of an object.

FIG. 15 explains a result of an application of the present invention.

FIG. 16 explains a result of an application of the present invention.

FIG. 18 shows the hardware configuration of an accessibility information acquisition device.

DETAILED DESCRIPTION OF THE PREFERRED EMBODIMENTS

Figure 1:
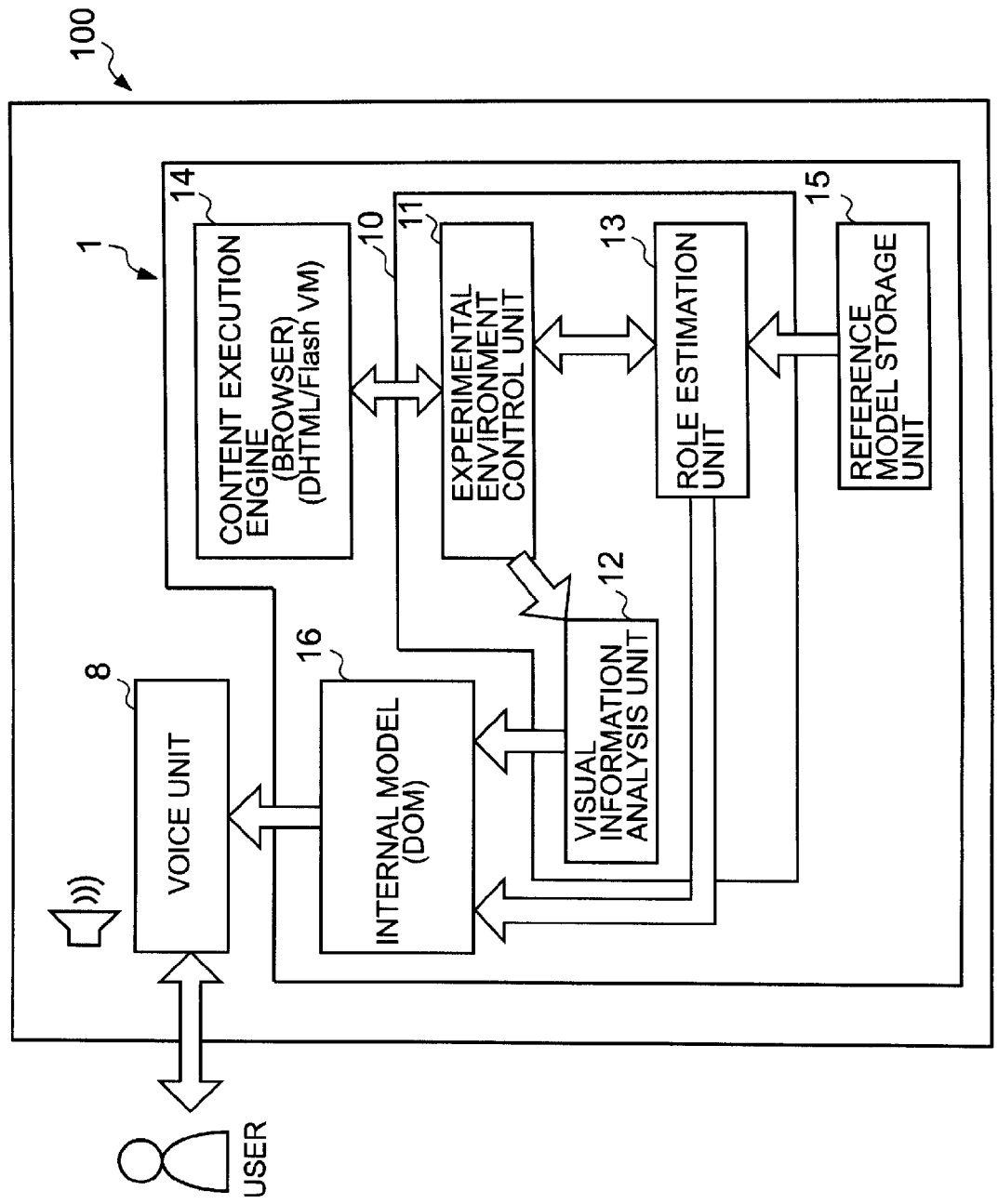
FIG. 1 shows an exemplary configuration of an accessibility information acquisition system according to one embodiment of the present invention.

The following describes embodiments of the present invention, with reference to the drawings. FIG. 1 shows an exemplary configuration of an accessibility information acquisition system 100 according to one embodiment of the present invention. The accessibility information acquisition system 100 includes an accessibility information acquisition device 1 that acquires accessibility information of an object in RIA content (hereinafter called an object of content, or simply called an object) and a voice unit 8 that notifies a user of the acquired accessibility information as voice data. The accessibility information acquisition device 1 includes as a control unit 10, an experimental environment control unit 11, a visual information analysis unit 12 and a role estimation unit 13. The accessibility information acquisition device 1 further includes a content execution engine 14, a reference model storage unit 15 and an internal model 16.

The experimental environment control unit 11 controls an experimental environment in which an object of content displayed via the content execution engine 14 such as a browser is executed, for example, on a display unit (not illustrated of a personal computer used by a user). Such an experimental environment executable without affecting other environments is called a Sandbox environment. An object of content is executed in such an experimental environment, whereby alternative text and Role serving as accessibility information are estimated. The visual information analysis unit 12 analyses, based on an object and information displayed in the vicinity of the object, as to whether the information relates to the object or not. More specifically, the visual information analysis unit 12 estimates, based on a positional relationship between the object and a text object displayed in the vicinity of the object, the text object as an alternative object representing the object. The role estimation unit 13 estimates a role of the object using a plurality of reference models in the reference model storage unit 15. The reference model storage unit 15 stores a plurality of reference models prepared beforehand. The internal model 16 receives accessibility information acquired by the control unit 10.

Figure 2:
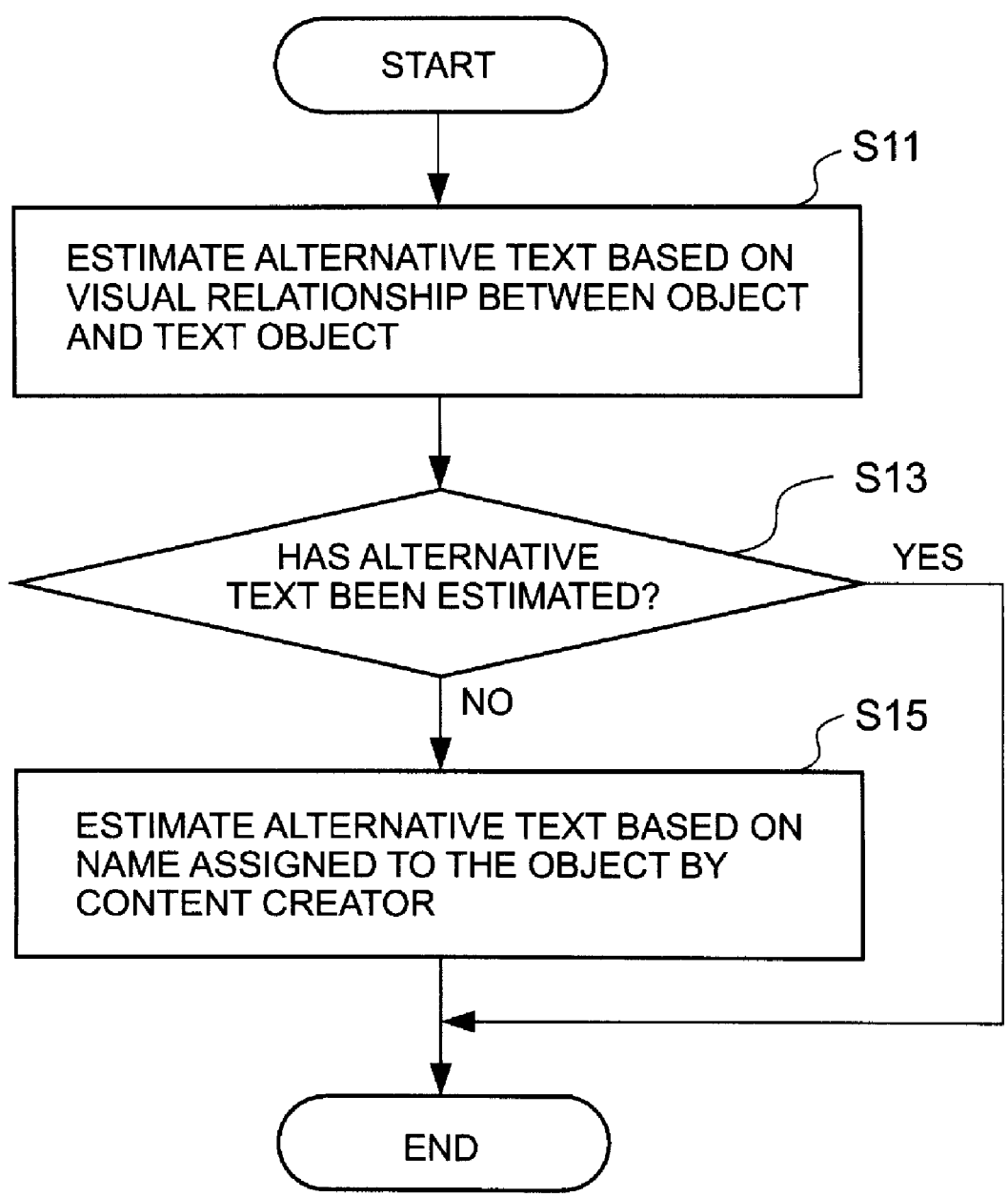
FIG. 2 is a flowchart of the processing for estimating alternative text of an object.

The following describes the processing of estimating accessibility information using alternative text. FIG. 2 is a flowchart of the processing for estimating alternative text of an object. FIG. 3 explains the contents of the flowchart of FIG. 2.

Figure 3A:
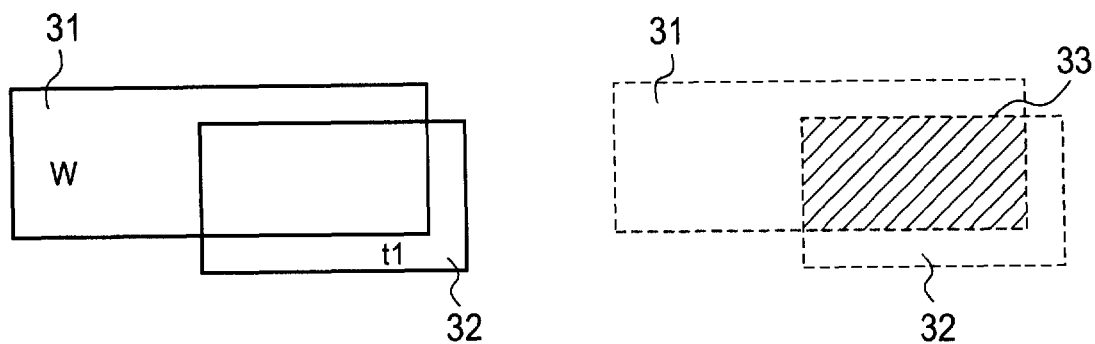
FIG. 3 explains the contents of the flowchart of FIG. 2.

First, at Step S11 of FIG. 2, the visual information analysis unit 12 estimates alternative text based on a visual relationship between the object and a text object displayed on a screen (not illustrated). Whether a certain text object is alternative text of the object or not is estimated by examining the visual relationship between the object and the text object. The relationship of an object W with alternative text t is determined by the following mathematical expressions:

[Expression 1]

$$\text{For } t \in \text{Text}(\text{Succ}(\text{Parent}(W)))$$

$$\begin{cases} \text{if Size}(W) > 0 \\ \quad \left(\dfrac{\text{Area}(t)}{\text{Int}(t, W)} > T_{text}\right) \cap \left(\dfrac{\text{Area}(W)}{\text{Int}(t, W)} > T_{widget}\right) \\ \text{otherwise} \\ \quad (\text{Dist}(W, t) < K_d \times \text{Diag}(t)) \cap (\text{Left}(W) < \text{Left}(t)) \cap (\text{Top}(W) > \text{Top}(t)) \end{cases}$$

where
- Text(nodes): among a node set nodes, a set of text objects
- Succ(node): a set of descendants of node
- Parent(node): a parent node of node
- Area(obj): display area of object obj
- $\text{Int}(\text{obj}_1, \text{obj}_2)$: overlapping area of $\text{obj}_1$ and $\text{obj}_2$
- $T_t, T_w, K_d$: constant concerning overlapping and distance
- $\text{Dist}(o_1, o_2)$: distance between objects $o_1$ and $o_2$
- Diag(obj): length of diagonal line of object obj
- Left(obj): coordinate at left end of object obj, where left is 0 and right is positive
- Top(obj): coordinate at upper end of object obj, where lower is 0 and upper is positive
- Size(obj): dimension of object obj, width × height Referring now to FIG. 3, this will be explained more specifically below. FIG. 3A shows the case where the object W is a button and the object W has a certain size (the size is not zero but has a certain range). Since a region 31 of the button as the range of the object W has an area, the range 31 has a certain overlapping region 33 with a region 32 as a range of a text object t1 displayed in the vicinity of the object W as the button (see right one of FIG. 3A). In this way, when the object W and the text object t1 overlap with each other at a certain range or more, it can be estimated that the text object t1 in the vicinity of the object W is alternative text t.

Figure 3B:
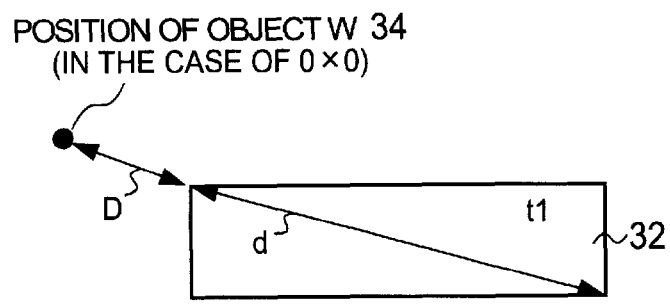

On the other hand, FIG. 3B shows the case where an object W is a button but has no size (the size is zero). For instance, some of the objects in content created using Flash™ may be a button with a size of zero. In this case, a relative position of the object W is used. First, the positional relationship between the position 34 of the object W representing the button and a region 32 of a text object t1 displayed in the lower-right of the position 34 is examined. Then, a length D of a shortest straight line from the position 34 of the object W to the text object t1 is compared with a length d of a diagonal line of the region 32 of the text object t1, and if D<d, it can be estimated that the text object t1 is alternative text t. This is based on an empirical rule that a text object t1 about an object W is generally enough closer to the object W and is located in the lower-right of the object W.

Referring back to FIG. 2, at the next Step S13, the control unit 10 judges whether alternative text has been estimated or not. In the case where there is no text object corresponding to either of the above FIG. 3A or 3B, alternative text has not been estimated. If alternative text can be estimated (Step S13: Y), the control unit 10 ends the processing because the alternative text can be estimated. On the other hand, if alternative text has not been estimated (Step S13: N), the control unit 10 estimates alternative text using a name (symbol) given to the object by a content creator at Step S15.

A content creator such as a programmer gives any name to an object to utilize it for programming. This is because a name is required for an object in order to refer to the object as a target of an operation for the programming. The content creator, for example, gives a name of "play_button" to a button for video playback. Such a name is utilized based on an empirical rule that the thus assigned name often represents the object directly. While the name is naturally required for the understanding of the content creator by himself/herself, it will help the understanding of a people other than the content creator, and therefore the name is used as alternative text of the object. Since there is no need to give a name to an object that is not operated in the program, such an object may be named automatically "instance#" (# is 1, 2 . . . ), for example for the reasons of run-time, which is not suitable for the alternative text. Therefore, the name that does not clearly represent the meaning of the object such as "instance#" may be stored in the form of a list, for example, in a storage unit (not illustrated), whereby such a name can be kept out of the alternative text. This name is acquired by the role estimation unit 13 with the help of an interpreter when the experimental environment control unit 11 executes in an experimental environment, and the visual information analysis unit 12 estimates alternative text based on the name.

After the processing at Step S15, the control unit 10 ends this processing. As a result of this processing, alternative text can be estimated for an object without alternative text.

Figure 5A:
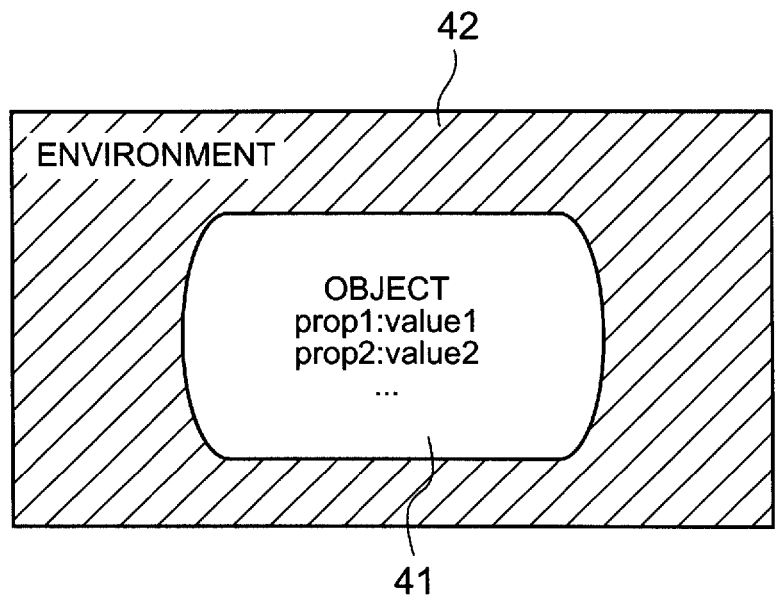
FIG. 5 explains the contents of the flowchart of FIG. 4.
Figure 5B:
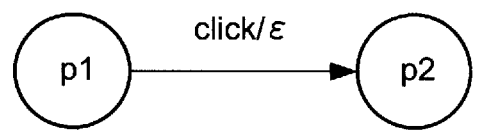
Figure 5C:
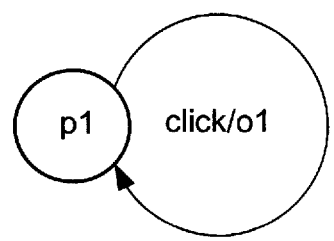
Figure 6:
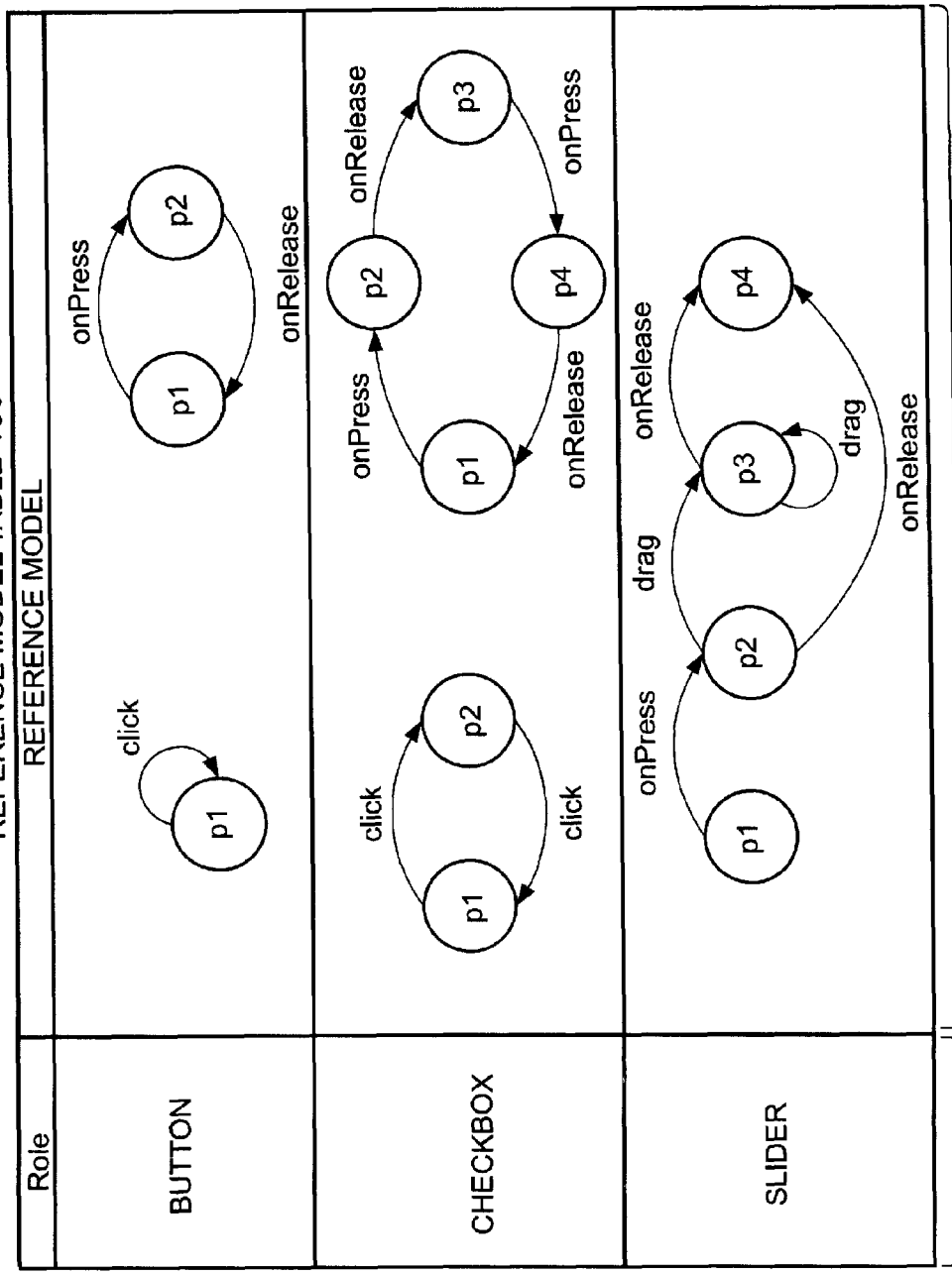
FIG. 6 explains the contents of the flowchart of FIG. 4.
Figure 7:
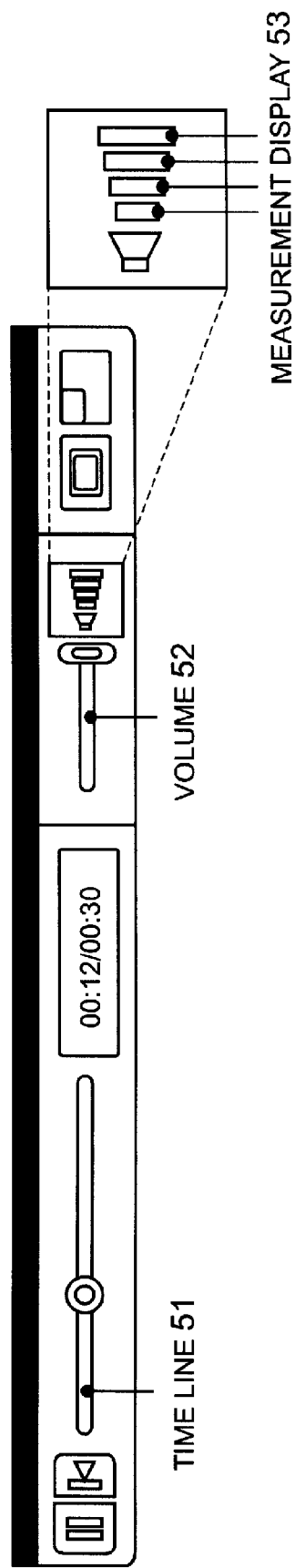
FIG. 7 explains the contents of the flowchart of FIG. 4.

The following describes the processing of estimating accessibility information based on Role. FIG. 4 is a flowchart of the processing for estimating Role of an object. FIGS. 5 to 7 explain the contents of the flowchart of FIG. 4.

First, at Step S31 of FIG. 4, the control unit 10 (the experimental environment control unit 11 and the role estimation unit 13) estimates Role based on an output when an object is executed and an internal state.

Herein, a method for estimating Role is described. Since Flash™ and DHTML use a language of ECMAScript whose type information is determined at the time of the execution, it is difficult to detect accessibility information thereof statically. Then, analysis is made when a script is executed in the experimental environment, thereby estimating accessibility information from a reference model by simulation. The simulation is a technique for verifying the equivalence between the reference model and the model during the execution and their inclusion relationship. In the present invention, the input such as clicking is actually performed with respect to the object to verify how the state changes or how such a change corresponds to the reference model, thus estimating the accessibility information.

More specifically, attention is focused on the internal state of the object whose accessibility information is to be estimated. In ECMAScript, the state of the object is represented in terms of a pair of a property and a value. All of the states other than this used during the execution are regarded as "Environment". FIG. 5A schematically shows an execution model in the simulation. A pair of a property and a value of the object is a state 41 of the object, and the remaining other than the object state 41 is an environment 42.

The present invention further provides a reference model to estimate a Role and a state required for accessibility of an object. The reference model can be defined by a model equivalent to a Mealy Machine as shown in FIGS. 5B and 5C. FIGS. 5B and 5C illustrate examples of reference models as buttons in a general sense. FIG. 5B means that "clicking" causes the object to make a transition from p1 to another state of p2. "ϵ" following "click" indicates an output but "ϵ" itself indicates that nothing is output to the outside. FIG. 5C means that "clicking" causes some output "o1" from the object p1 to the outside. Although the state of the object may be designated in the model explicitly, it may be designated loosely as in that separate states in a model indicate separate states of the object.

The simulation of sending a "click" event is conducted to an actual object as well, whereby estimation can be made thereto as to whether it is a button or not based on a matching relationship with these models. For instance, if a button similar to the model of FIG. 5B is clicked, it can be found that the object itself has some influence. In the case of the model of FIG. 5C, it can be found that the clicking causes some output to the environment. For instance, if the output is a call of "getURL" method, a certain transition in a page will be found on the browser. A transition in a page caused by a button can be significantly useful information for a visually impaired user. At this time, a URL (Uniform Resource Locator) may be acquired and read aloud, which helps a visually impaired user understand what button it is. The reference models exemplified in FIGS. 5B and 5C are stored in the reference model storage unit 15 (see FIG. 1).

FIG. 6 shows a reference model table 150 stored in the reference model storage unit 15. The reference model table 150 consists of a Role 151 and a reference model 152, in which one or a plurality of reference models are stored for each Role. For instance, for a Role 151 a "button", two reference models are defined including a model of conducting "click" and a model of conducting "on Press". Note that a method for verifying Role estimated at Step S31 of FIG. 4 will be described later.

Referring back to FIG. 4, at the next Step S33, the control unit 10 (the visual information analysis unit 12) judges whether alternative text has been estimated or not based on a visual relationship between the object and the text object. The process of estimating alternative text based on the visual relationship between the object and the text object uses a result of the above-stated Step S11 of FIG. 2. If alternative text can be estimated (judgment is YES at the process of Step S33), the control unit 10 ends the processing. On the other hand, if alternative text has not been estimated (judgment is NO at the process of Step S33), the control unit 10 transfers the processing to Step S35.

At Step S35, the control unit 10 judges whether the Role is not judged as a Role requiring an operation of the object by clicking or not. More specifically, for an object W whose alternative text has not been estimated based on the visual relationship between the object and the text object, if such an object satisfies the following condition, it is judged that the object does not have a Role that operates by clicking on the object W only (for example, a button, a check box, or a radio button).

| [Expression 2] |
|---|
| $(Size(W) < T_s) \cup (Height(W) \times K_h > Width(W)) \cup (Width(W) \times K_w > Height(W))$ |
| where |
| $T_s, K_h, K_w$: constant concerning size and dimension |
| Size(obj): dimension of object obj, width × height |
| Width(obj): width of object |
| Height(obj): height of object |

This expression means that an object with a Role such as a button becomes a target of an operation by the user. Therefore, it is based on the assumption that a Role has a certain degree or more of size, and has a shape that is not too narrow. For instance, among the objects of FIG. 7, a time line 51, a volume 52 and a measurement display 53 have an event handler such as onPress for enabling the operation of the respective objects. Since the above-stated object with a Role such as button similarly has an event handler such as onPress, if consideration is not given thereto, an object of a type other than a button may be misidentified as a button. To cope with this, an object without a certain degree or more of size or an object with a certain degree or more of narrow shape is not estimated as an object with a Role such as a button.

At Step S35 if it is judged that an operation by clicking is not required (judgment is YES at the process of Step S35), the control unit 10 transfers the processing to Step S37. On the other hand, if it is judged that an operation by clicking is required (judgment is NO at the process of Step S35), the control unit 10 ends this processing.

At Step S37, the control unit 10 keeps the object out of candidates of Role that are estimated at Step S31. Thereafter, the control unit 10 ends the processing. According to the processing, the Role of the object can be estimated, and the estimated Role can be made accessibility information.

Figure 8:
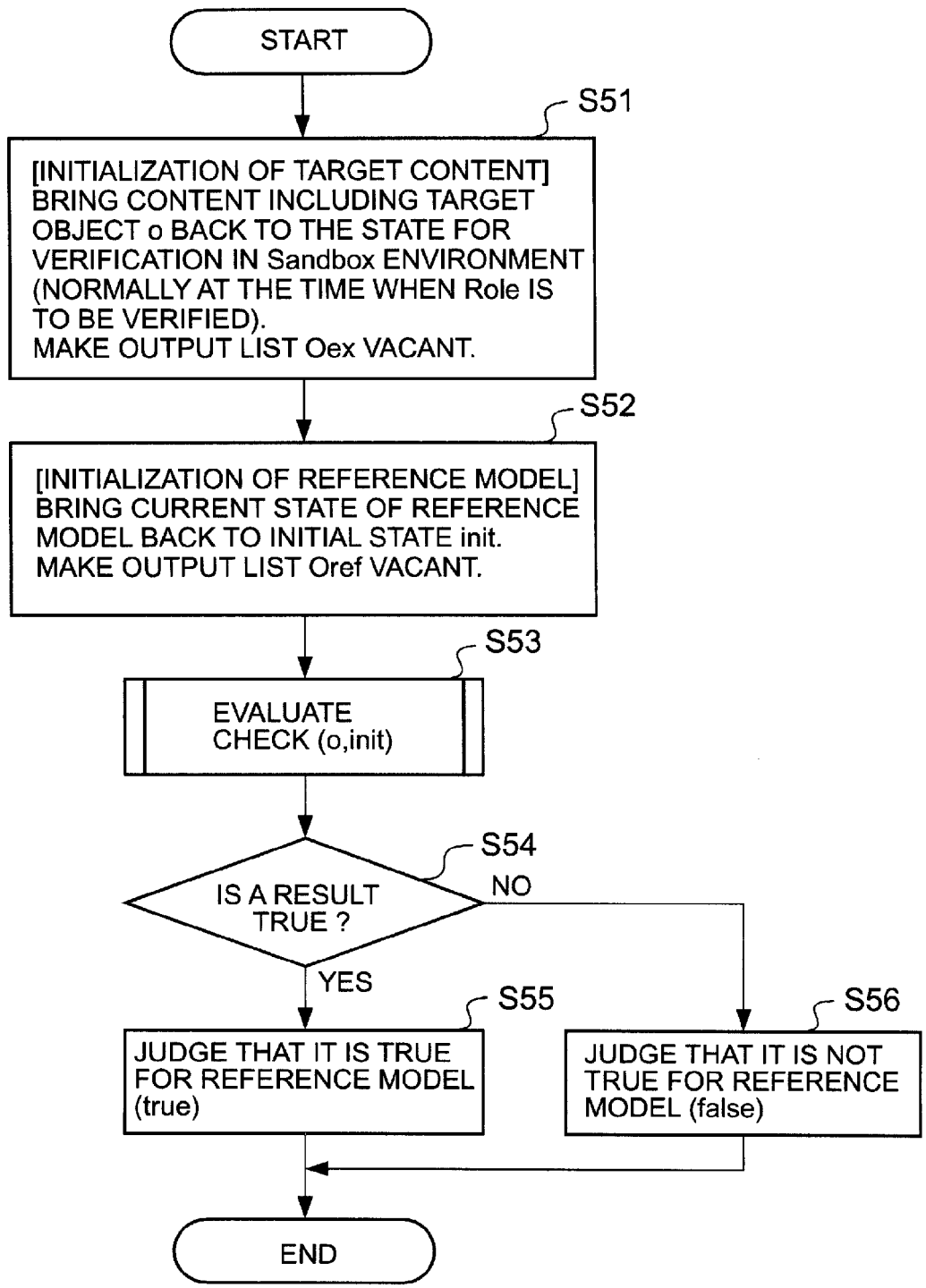
FIG. 8 is a flowchart of checking whether an actual object includes a reference model.
Figure 9:
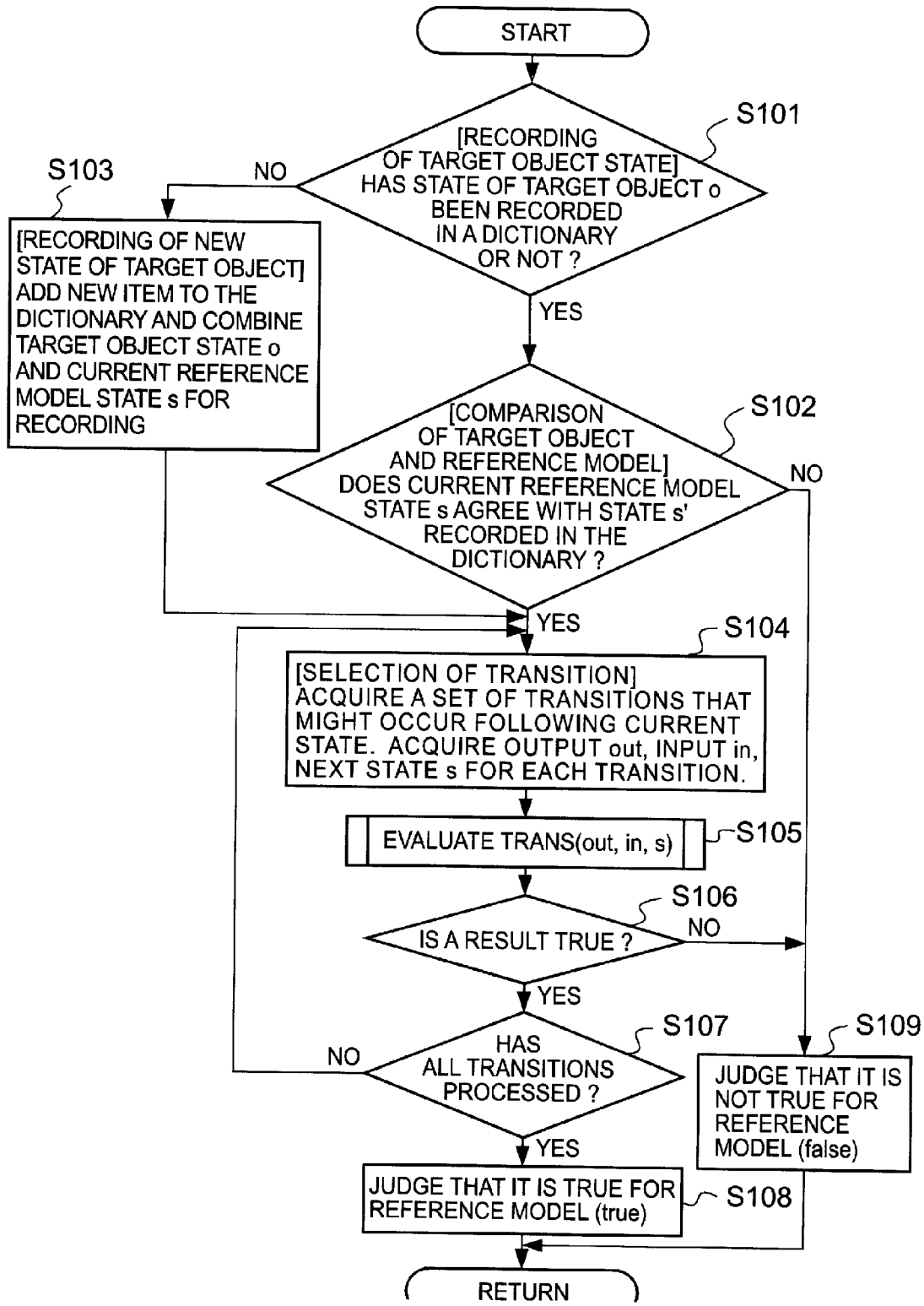
FIG. 9 is a flowchart of checking whether an actual object includes a reference model.
Figure 10:
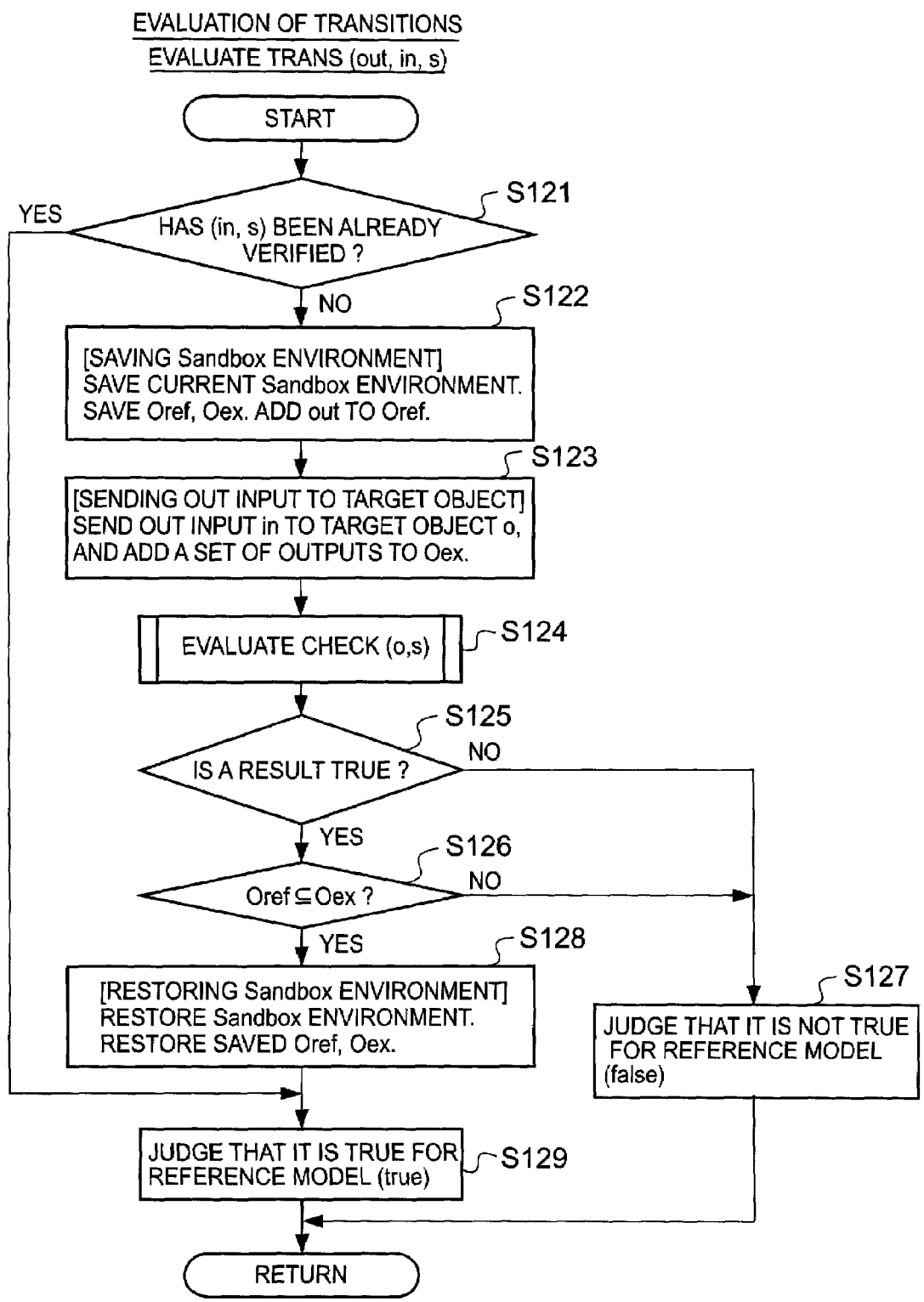
FIG. 10 is a flowchart of checking whether an actual object includes a reference model.

The following describes a flowchart of verifying the Role that is estimated at Step S31 of FIG. 4. FIGS. 8 to 10 are a flowchart of checking as to whether an actual object includes a reference model. Herein, it is assumed that the object as a target of the checking is a target object o.

First, at Step S51 of FIG. 8, the control unit 10 (experimental environment control unit 11) initializes target content. More specifically, content including the target object o is brought back to the state for verification in Sandbox environment. Then, an output list indicated by Oex is made vacant. Oex is a region for storing information output as a result of the execution of a real object.

Next, at Step S52, the control unit 10 initializes a reference model. More specifically, the current state of the reference model to be verified is made an initial state (init), and an output list indicated by Oref is made vacant. Oref is a region for storing output information of the reference model.

Next, at Step S53, the control unit 10 (role estimation unit 13) verifies the state s of the reference model in the initial state. Referring now to FIG. 9, the verification of the state s of the reference model will be described below.

First, at Step S101 of FIG. 9, the control unit 10 judges as to whether the state of the target object o has been recorded in a dictionary or not, that is, whether the state of the target object o has been already recorded in a dictionary stored in the storage unit. If it has been recorded (Step S101: Y), the control unit 10 transfers the processing to Step S102. On the other hand, if it has not been recorded (Step S101: N), the control unit 10 transfers the processing to Step S103.

At Step S102, the control unit 10 compares the target object and the reference model so as to judge whether the current state s of the reference model agrees with the state s' recorded in the dictionary or not. If they agree (Step S102: Y), the control unit 10 transfers the processing to Step S104. On the other hand, if they do not agree (Step S102: N), the control unit 10 transfers the processing to Step S109, and after judgment is made (false) meaning that it is not true for the reference model, the verification processing ends.

At Step S103, the control unit 10 records a new state of the target object on the dictionary. More specifically, a new item is added to the dictionary, and the state of the target object o and the current state s of the reference model are combined for recording.

At Step S104, the control unit 10 acquires a set of transitions that might occur following the current state. Then, the control unit 10 acquires an output out, an input in and a next state s for each transition. If there are a plurality of transitions that might occur next, the processing is conducted to each of them. Next, at Step S105, the control unit 10 evaluates the transitions using the data acquired at Step S104. Referring now to FIG. 10, the evaluation of transitions will be described below.

At Step S121 of FIG. 10, the control unit 10 judges as to whether the transition to be evaluated has been verified or not. If it has been verified (Step S121: Y), the control unit 10 transfers the processing to Step S129, and after judgment is made (true) meaning that it is true for the reference model, the verification processing ends. On the other hand, if it has not been verified (Step S121: N), the control unit 10 transfers the processing to Step S122.

At Step S122, the control unit 10 saves the Sandbox environment. More specifically, Oref and Oex are saved, and an output out as a parameter is added to Oref from Step S105. Next, at Step S123, an input is sent out to the target object o. More specifically, an input in is sent out to the target object o and a set of outputs is added to Oex.

Next, at Step S124, verification is conducted with respect to the state s obtained at Step S123. That is, FIG. 9 is called again. That is to say, the processing is nested whereby an evaluation and a transition are repeated until the verification has been completed, so as to verify the target object o. Next, at Step S125, judgment is made as to whether the evaluation result is true or not. If it is judged that the evaluation result is true (Step S125: Y), the control unit 10 transfers the processing to Step S126. On the other hand, if it is judged that the evaluation result is not true (Step S125: N), the control unit 10 transfers the processing to Step S127, and after judgment is made (false) meaning that it is not true for the reference model, the transition processing ends.

On the other hand, at Step S126, the control unit 10 judges whether Oref is equal to Oex or whether Oref is included in Oex. The inclusion of Oref in Oex is with consideration given to the fact that in Oex more various states tend to occur during the generation of an event. If the above-stated condition is satisfied (Step S126: Y), the control unit 10 transfers the processing to Step S128. On the other hand, if the above-stated condition is not satisfied (Step S126: N), after conducting the processing of the above-stated Step S127, the control unit 10 ends the transition processing.

At Step S128, the control unit 10 restores the Sandbox environment. That is, the saved Oref and Oex are restored. Thereafter, the processing of the above-stated Step S129 is conducted and the evaluation processing ends.

Referring back to FIG. 9, at Step S106, the control unit 10 judges whether the evaluation result of the transition is true or not. If the evaluation result of the transition is true (Step S106: Y), the control unit 10 transfers the processing to Step S107. On the other hand, if the evaluation result of the transition is not true (Step S106: N), the control unit 10 conducts the processing of the above-stated Step S109, and the verification processing ends.

At Step S107, the control unit 10 judges whether all of the transitions have been processed or not. All of the transitions mean a plurality of transitions that might occur after the above-stated Step S104. If all of the transitions have been processed (Step S107: Y), the processing is transferred to Step S108. On the other hand, if all of the transitions have not been processed (Step S107: N), the processing is transferred to Step S104 so as to evaluate other transitions as well.

At Step S108, the control unit 10 judges that it is true for the reference model (true) and the verification processing ends.

Referring back to FIG. 8, at Step S54, the control unit 10 judges whether the evaluation result is true or not. If the evaluation result of the verification is true (Step S54: Y), after judging that it is true for the reference model at Step S55 (true), the control unit 10 ends the processing. On the other hand, if the evaluation result of the verification is not true (Step S54: N), after judging that it is not true for the reference model at Step S56 (false), the control unit 10 ends the processing.

Figure 11:
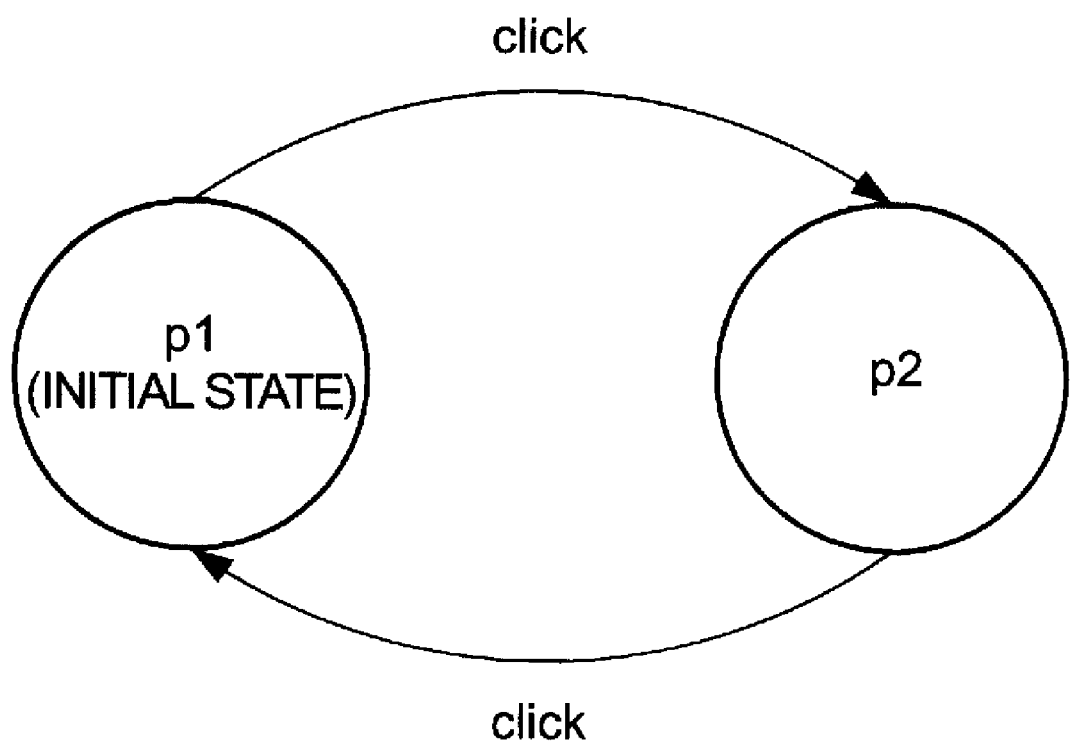
FIG. 11 shows a reference model of checkbox.

In order to facilitate the understanding of the flowchart of FIGS. 8 to 10, the following describes a specific example. FIG. 11 shows a reference model of checkbox. The flowchart described referring to FIGS. 8 to 10 is applied to this reference model. Herein, it is assumed that checkbox as content to be verified is a target object o. This target object o is a type such that every time the checkbox is turned on/off, the content thereof is loaded on the side of a different window for display, or does not become displayed.

1. Initialization of the target content. This indicates that the state of the content is brought back so that the target object o can receive the operations of drag and a mouse operation. Further, Oex is made vacant.

2. Initialization of the reference model. Since the initial state is p1, the current state is made p1. Further, Oref is made vacant.

3. check (o, p1) is evaluated. The following description is about check( ).

4. The state of the target object o is recorded. For instance, it is assumed that checked property is defined in o and the initial value is false. Then, a pair of checked:false is recorded as the state.

5. Since the above state (checked:false) has not been recorded, an item is newly added to the dictionary so as to record it while combining with the current state of p1.

6. Since according to FIG. 11 the state that can be obtained by the transition from p1 is p2 only, trans ($\phi$, click, p2) is evaluated (herein, $\phi$ indicates no output). The following description is about trans( ).

7. Since (click, p2) has not been verified yet, the evaluation is continued.

8. Sandbox environment is saved and Oref and Oex are saved. Since out is φ for Oref, nothing is added thereto.

9. click is sent out to the target object o. The content operates to output something. Herein, it is assumed that getURL is output, for example. Then, Oex={getURL}.

10. check (o, p2) is evaluated recursively. The following description is similarly about check( ).

11. The state of the target object o is recorded. Herein, it is assumed that the value of the checked property is true. Then, a pair of checked:true is recorded as the state.

12. Since the above state (checked:true) has not been recorded, an item is newly added to the dictionary so as to record it while combining with the current state of p2.

13. Since according to FIG. 11 the state that can be obtained by the transition from p2 is p1 only, trans (φ, click, p1) is evaluated. The following description is again about trans( ) algorithm.

14. Since (click, p1) has not been verified yet, the evaluation is continued.

15. Sandbox environment is saved and Oref and Oex are saved. Since out is φ for Oref, nothing is added thereto.

16. click is sent out to the target object o. The content operates to output something. Herein, it is assumed that getURL is output, for example. Then, Oex={getURL, getURL}.

17. check (o, p1) is evaluated recursively. The following description is similarly about check( ).

18. The state of the target object is recorded. Herein, it is assumed that the value of the checked property is false. Then, a pair of checked:false is recorded as the state.

19. Since the above state (checked:false) has been recorded, which is recorded as p1 in the dictionary and agrees with p1 as the current state, the evaluation is continued.

20. The state that can be obtained by the transition from p1 is p2 only, trans (φ, click, p2) is evaluated. The following description is about the third trans( ) algorithm.

21. Since (click, p2) has been verified, the verification becomes true.

22. The process is brought back to the evaluation of the third check( ) algorithm. Since the result is true and all of the transitions have been processed, it becomes true.

23. The process is brought back to the evaluation of the second trans( ). Since the result of check( ) is true, Oref ⊂ Oex is checked. Since Oref=φ, the evaluation is continued.

24. Sandbox environment is brought back to the previous state. Oref and Oex are brought back to the previous states. Then, Oref=φ, and Oex={getURL}. Finally, trans( ) becomes true.

25. The process is brought back to the evaluation of the second check( ) algorithm. Since the result is true and all of the transitions have been processed, it becomes true.

26. The process is brought back to the evaluation of the first trans( ). Since the result of check( ) is true, Oref ⊂ Oex is checked. Since Oref=φ, the evaluation is continued.

27. Sandbox environment is brought back to the previous state. Oref and Oex are brought back to the previous states. Then, Oref=φ and Oex=φ. Finally, trans( ) becomes true.

28. The process is brought back to the evaluation of the first check( ) algorithm. Since the result is true and all of the transitions have been processed, it becomes true.

29. Since the first check( ) algorithm returns true, it is finally judged that the target object is true for the checkbox reference model.

Figure 12:
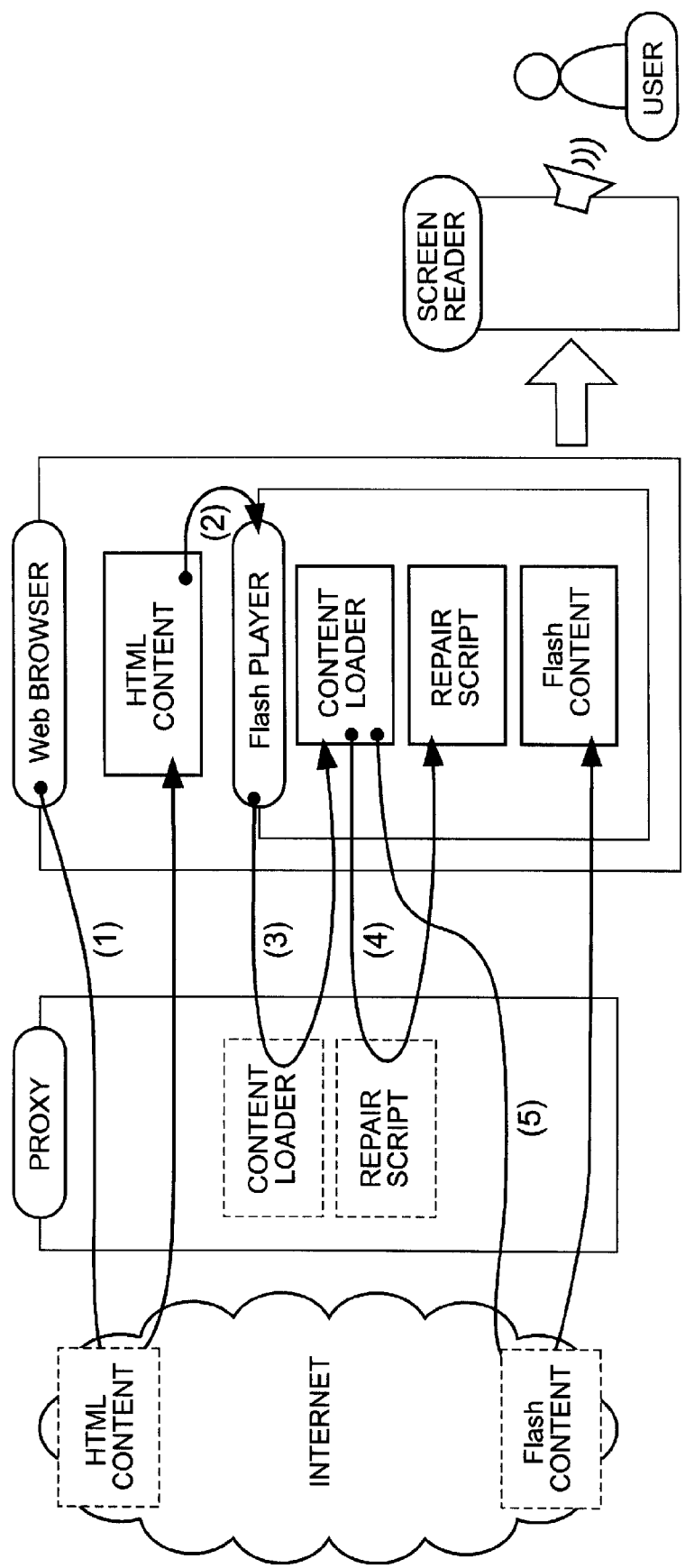
FIG. 12 shows a method for acquiring accessibility information in Flash content.

Next, the accessibility that can be obtained from the above description will be described below, where Flash™ content is exemplified. FIG. 12 shows a method for acquiring accessibility information in Flash™ content.

As for Flash™, it is difficult to create an experimental environment because of the license of a file format. The following describes a method by which even when an experimental environment cannot be constructed in Flash™ VM as a Flash™ player, the internal structure of the Flash™ content is analyzed to estimate accessibility information. Herein, a Web browser is connected with the Internet via a proxy. The details of the method follow.

First, the Web browser requests HTML content from the Internet to obtain the HTML content ((1) in the drawing). Next, based on an <object> tag of the acquired HTML content, the Flash™ player is created ((2) in the drawing). Then, during the course when a request is made to the Flash™ content, the Flash™ player obtains Content Loader from the proxy ((3) in the drawing). The Content Loader requests Repair Script to obtain the Repair Script from the proxy ((4) in the drawing). The Content Loader further requests Flash™ content to obtain the Flash™ content from the Internet ((5) in the drawing).

Herein, a function is inserted in prototype property in Object by the Repair Script of (4) in the drawing, whereby information on internal object model is acquired and an experimental environment is constructed. In order to observe an internal state of Flash™ and an output to the outside, a function having a side effect enabling replacement is hooked so as to prevent a side effect such as a change of a value. Further, a change in property and visual information are objected by utilizing a watch function of ActionScript, thus estimating accessibility information.

The following describes an output of the accessibility information obtained by the above description in the Flash™ content. A respective object of the Flash™ content has an attribute called _accProps and _accImpl, which can be made a set with information for accessibility such as Role and alternative text. Thus, these attributes are set, whereby estimated accessibility information can be output. The output accessibility information is provided to a user as voice via a screen reader.

Figure 13A:
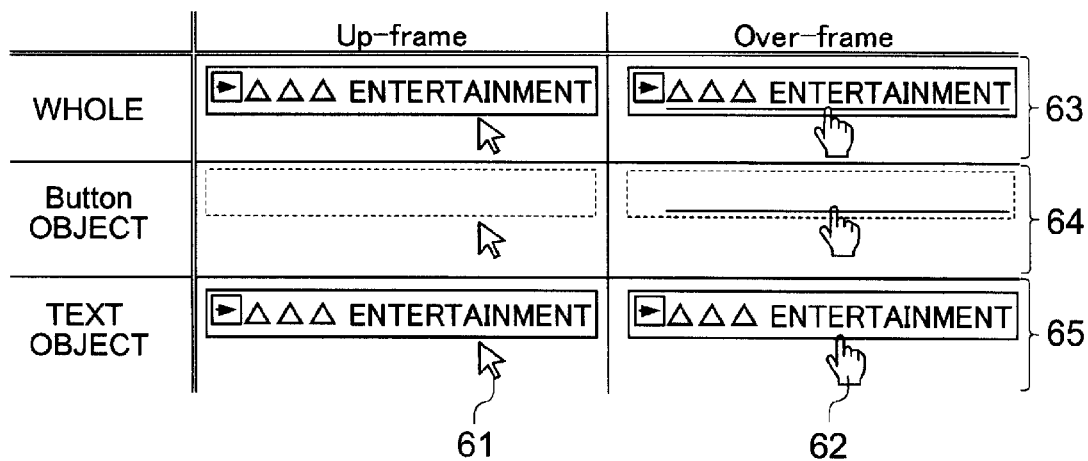
FIG. 13 shows an example representing Role of a Button object.
Figure 13B:
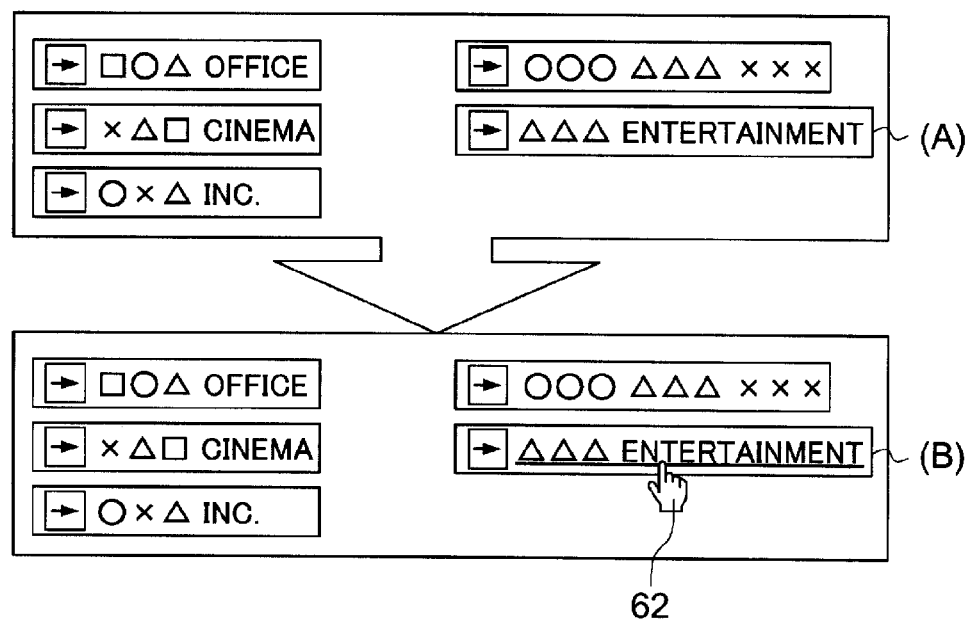

In the Flash™ player, however, somewhat special processing is required for setting button Role appropriately. For instance, in Flash™ content, an object for representing a button Role called Button object exists, and such an object requires the special processing. The Button object has a frame called Up-frame or Over-frame. The Up-frame and Over-frame hold graphics of a Button in states where a mouse is not in contact with an object and a mouse is in contact with an object, respectively. FIG. 13 shows an example representing Role of a button called Button object. FIG. 13A explains a Button object 64, a text object 65 and the whole object 63 in which the Button object 64 is overlaid on the text object 65 in the case of Up-frame and Over-frame. Herein, the text object is image data on which link-destination information is written. In the case of Up-frame, that is, in the case where a mouse is not in contact with an object, it is displayed as an arrow 61, whereas in the case of Over-frame, that is, in the case where the mouse is in contact with the object, it is represented as a hand-shaped arrow 62. In the case of Over-frame, an underline is further given to the Button object. FIG. 13B shows an actual example of use. When the Button object in (A) of the drawing is brought into contact with the hand-shaped arrow 62, an underline is given thereto as shown in (B).

In the case where graphics are not set in Up-frame, the Flash™ player judges that the size of the button is 0x0, and does not provide accessibility information as the button. When such a button with a problem concerning Up-frame is detected, a Button object serving as a proxy allowing accessibility information to be output normally is created, and in the case where a "click" event is sent to the button as the proxy, the "click" event is sent to the button as a target (with a problem about Up-Frame).

Figure 14:
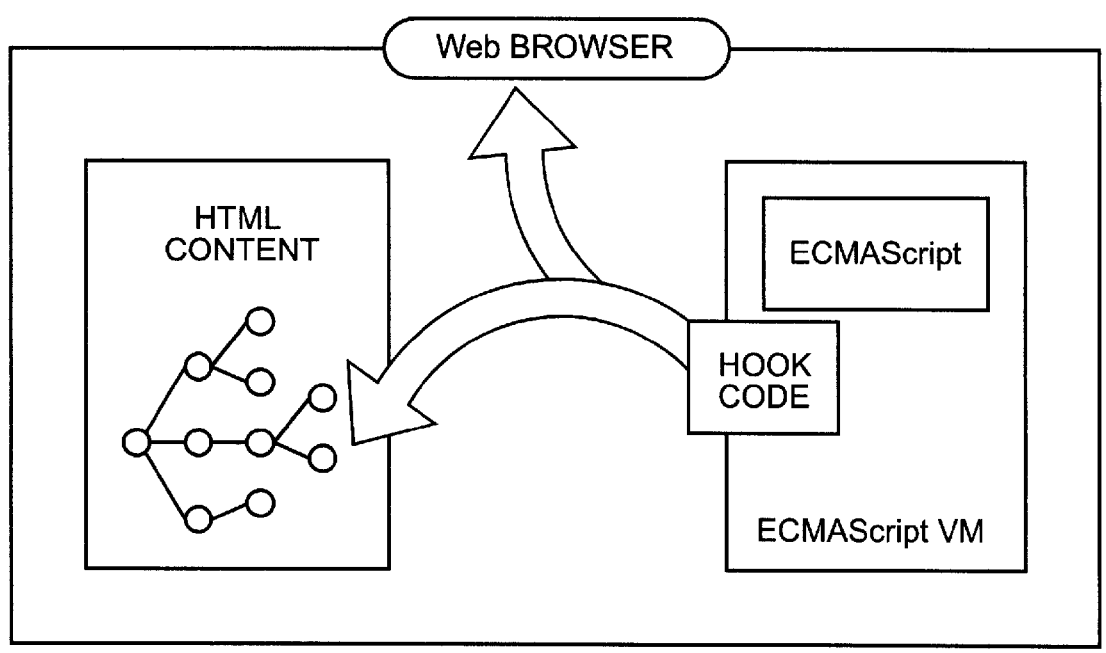
FIG. 14 shows a method for acquiring accessibility information in DHTML content.

The following describes the case of DHTML content as an example. In an environment of DHTML, a script is executed by ECMAScript VM on a browser that executes ECMAScript. Therefore, it is easy to construct an experimental environment on the VM. That is, it is adapted so as to allow an operation of a mechanism for observing an object and an external environment to be controlled. FIG. 14 shows a method for acquiring accessibility information in DHTML content. As shown in FIG. 14, a hook code is put into ECMAScript VM, from which accessibility information is obtained. More specifically, any partial object monitoring mechanism allows an extended function to be implemented with Mozilla™ as one of Web browsers. Further, visual information is obtained by referring to style property of a respective object.

The following describes an output of the estimated accessibility information obtained by the above description in the DHTML content. In the DHTML content, alternative text can be output by altering an alt attribute and a title attribute. Further, Role information of object can be output by adding a Role attribute in accordance with specifications of the WAI-ARIA. Thus, by setting these attributes, the estimated accessibility information can be output.

The following describes a result of an actual application of the present invention in worldwide famous sites, with reference to FIGS. 15 and 16. FIG. 15 shows an example of reading-aloud using a typical screen reader before obtaining accessibility information (Before) and after obtaining accessibility information and altering the same automatically (After). FIG. 16 shows the number of (1) total buttons before and after alteration, (2) buttons that are not output, (3) buttons that cannot be operated by keyboard and should not be output, and (4) buttons without alternative text. This example uses the content on a Web page with "X○Δ1" and "○Δ□2". In "X○Δ1", four buttons are output before alteration, each of which simply shows "Buttons" and is not provided with alternative text indicating what button it is. In "○Δ□ 2", fifteen buttons out of nineteen buttons are not provided with alternative text, and one of the four buttons with alternative text is a button that cannot be operated by keyboard. These contents are automatically altered, resulting in "X○Δ1" eight buttons that are not output before the automatic alteration can be output after the automatic alteration, to each of which alternative text can be assigned. However, appropriate alternative text cannot be assigned to the four buttons output before the alteration. In "○Δ□2", out of the fifteen buttons without alternative text, alternative text can be assigned to twelve buttons. In the case of "○Δ□2", it is not impossible to alter the buttons that cannot be operated by keyboard so as not to be output. However, it is possible to prove that automatic alteration allows the improvement of accessibility as a whole.

According to the present invention, it is possible to automatically improve the accessibility in content of RIA such as Flash™ content and DHTML content, which can bring significant advantages to a user who accesses such content using a screen reader. For instance, in "X○Δ1" or "○Δ□2", if the present invention is not applied thereto, most of the objects do not have alternative text, and even buttons that cannot be clicked originally will be read aloud by a screen reader as "button". Therefore, a user cannot operate it at all practically. If the present invention is applied to such a case, however, appropriate information and alternative text, which indicate that they are buttons, can be successfully assigned to many objects that are not accessible, as shown in FIGS. 15 and 16. Therefore, a user of a screen reader also is enabled to operate these buttons.

The present invention cannot improve the accessibility for all of the objects. However, most of the Flash™ content and the DHTML content currently distributed via the Internet are not accessible, and it is unlikely expected to improve the accessibility thereof by a content creator himself/herself. According to the present invention, accessibility to such content can be secured automatically, although accessibility may not be perfect.

Figure 17:
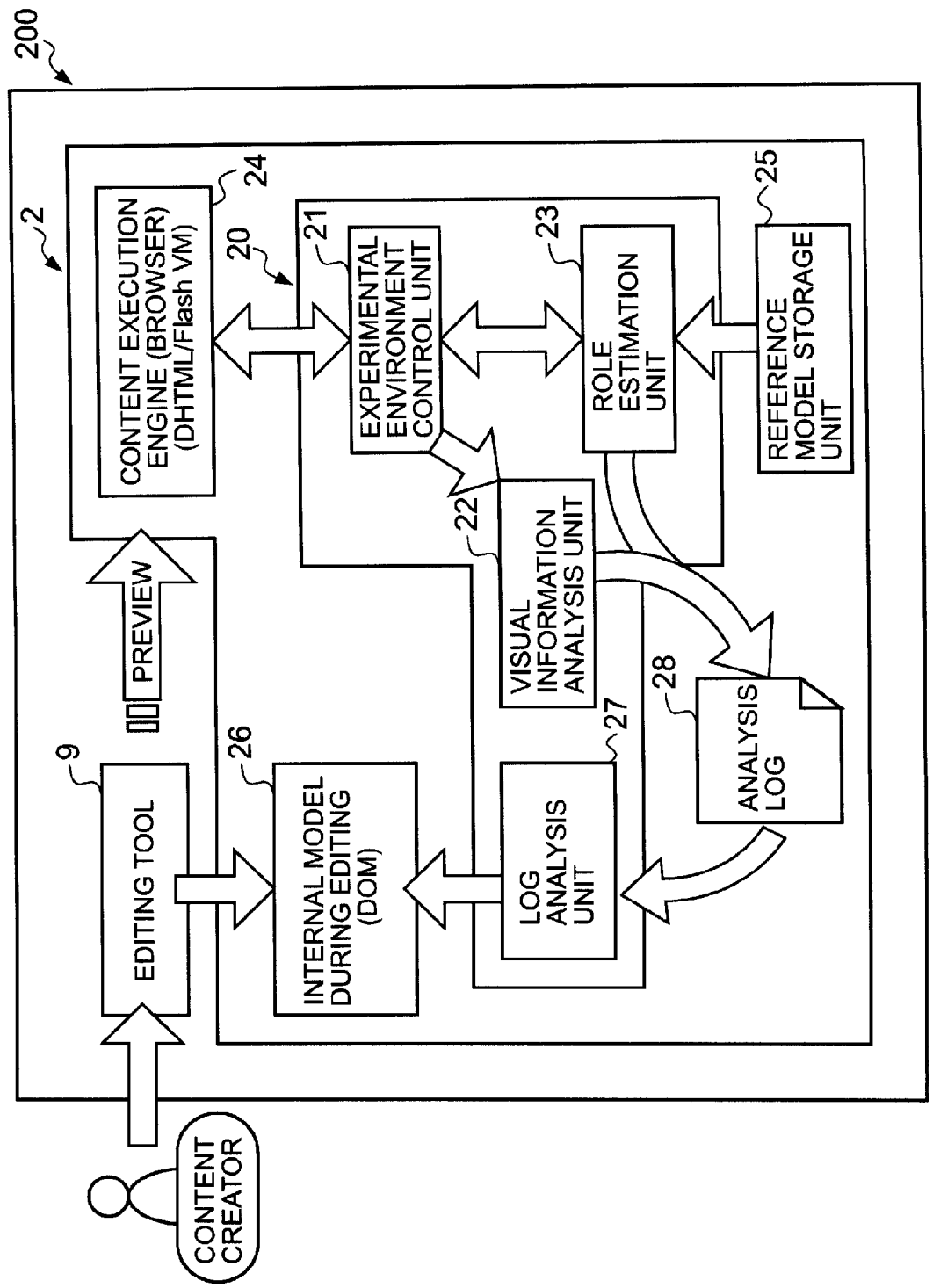
FIG. 17 shows an example in which an accessibility information acquisition device is used for the creation of content.

Furthermore, the obtained advantages are not only for a user who uses a screen reader but also for a content creator so as to reduce the trouble of making the content accessible. FIG. 17 shows an example in which an accessibility information acquisition device 2 is used for the creation of content. The accessibility information acquisition device 2 acquires an analysis log 28 of execution from a visual information analysis unit 22 and a role estimation unit 23, and a log analysis unit 27 of the accessibility information acquisition unit 2 analyzes the log, thus outputting accessibility information to an internal model during editing 26. A content creator uses the internal model during editing 26 with an editing tool 9 to create content, whereby content can be created conforming to specifications of WAI-ARIA.

It is expected that Flash™ content and DHTML content will be a continuously important client technique in rich internet applications (RIA), and the improvement of accessibility is an important matter. As described above in detail, the present invention mainly utilizes three pieces of information: (1) visual display information of an object and text information displayed on a screen; (2) symbol information allocated to an object; and (3) output of an object and a change in an internal state thereof so as to estimate accessibility information of the object. The present invention as such can improve the accessibility of already-existing content automatically, and moreover can contribute to the securing of accessibility in content that will be developed in the future, and therefore it is expected that the importance of the present invention will be further increased in the future.

FIG. 18 shows the hardware configuration of the accessibility information acquisition device 1 according to one embodiment of the present invention. Although the following describes the overall configuration as an information processing device that is a computer typically, needless to say, a required minimum configuration can be selected for a device with a special-purpose or an embedded-type device in accordance with the environment.

The accessibility information acquisition device 1 includes a CPU (Central Processing Unit) 1010, a bus line 1005, a communication I/F 1040, a main memory 1050, a BIOS (Basic Input Output System) 1060, a parallel port 1080, a USB port 1090, a graphic controller 1020, a VRAM 1024, a voice processor 1030, an I/O controller 1070 and input means 1100 such as a keyboard and a mouse adaptor. To the I/O controller 1070, storage means can be connected, which includes devices such as a flexible disk (FD) drive 1072, a hard disk 1074, an optical disk drive 1076, and a semiconductor memory 1078. To the graphic controller 1020, a display device 1022 is connected. As an option, to the voice processor 1030, an amplifier circuit 1032 and a speaker 1034 are connected.

The BIOS 1060 stores, for example, a boot program that the CPU 1010 executes when the accessibility information acquisition device 1 starts and a program depending on the hardware of the accessibility information acquisition device 1. The FD drive 1072 reads out a program or data from a flexible disk 1071 and provides the same to the main memory 1050 or the hard disk 1074 via the I/O controller 1070.

As the optical disk drive 1076, a DVD-ROM drive, a CD-ROM drive, a DVD-RAM drive or a CD-RAM drive is available, for example. In this case, an optical disk 1077 conforming to a respective drive has to be used. The optical disk drive 1076 also can read out a program or data from the optical disk 1077 and can provide the same to the main memory 1050 or the hard disk 1074 via the I/O controller 1070.

A computer program provided to the accessibility information acquisition device 1 is stored in a recording medium such as the flexible disk 1071, the optical disk 1077 or a memory card, which is then provided to a user. This computer program is read out from the recording medium via the I/O controller 1070, or is downloaded via the communication I/O 1040, thus being installed in the accessibility information acquisition device 1 for execution. Operations of the information processing device under the control of the computer program are the same as the operations of the above-described device, and therefore the description thereof has been omitted.

The above-stated computer program may be stored in an external storage medium. As the storage medium, the flexible disk 1071, the optical disk 1077 or a memory card as well as a magnetooptical recording medium such as a MD and a tape medium are available. Further, a storage device such as a hard disk or an optical disk library provided in a server system connected with a private communication line or the Internet may be used as the recording medium, and the computer program may be provided to the accessibility information acquisition device 1 via the communication line.

Although the above example has been described concerning the accessibility information acquisition device 1, functions similar to those of the above-described information processing device can be implemented by installing a program having the functions described for the information processing device in a computer and making the computer operate as the information processing device. Thus, the information processing device described as one embodiment of the present invention can be provided as a method and a computer program therefore as well.

The accessibility information acquisition device 1 of the present invention can be embodied as hardware, software or a combination of hardware and software. In an embodiment as the combination of hardware and software, a typical example includes an embodiment of a computer system having a predetermined program. In such a case, the predetermined program is loaded and executed in the computer system, whereby the program makes the computer system execute the processing according to the present invention. This program is composed of a command group that can be represented in any language, code or notation. Such a command group enables the system to execute a specific function directly, or enables the execution after any one of or both of (1) a conversion into another language, code or notation and (2) a copy to another medium. Of course, the present invention covers not only such a program itself but also a program product including a medium recording such a program. A program enabling the execution of the functions of the present invention can be stored in any computer readable medium such as a flexible disk, a MO, a CD-ROM, a DVD, a hard disk device, a ROM, a MRAM or a RAM. For the storage on a computer readable medium, such a program can be downloaded from another computer system connected thereto via a communication line or can be copied from another medium. Further, such a program can be compressed or can be divided into a plurality of programs, which can be stored into a single or a plurality of recording media.

Although that is the description of the present invention by way of embodiments, the present invention is not limited to the above-described embodiments. The effects in the embodiments of the present invention are simply described as the most preferable effects obtained from the present invention, and the effects of the present invention are not limited to those described in the embodiments or examples of the present invention.

What is claimed is:

1. A method for obtaining accessibility information in content of a rich internet application, the method comprising the steps of:

executing, in an experimental environment, an object of the content displayed on a display screen;

on the condition that the object is executed, in accordance with output information output from the object and a state of the object, estimating a role of the object using reference model information prepared beforehand concerning a plurality of objects; and outputting the estimated role of the object as the accessibility information;

wherein the step of estimating the role comprises the steps of:

initializing the experimental environment:

recording a state of the object;

comparing the recorded state of the object and a state of the reference model information;

acquiring a state corresponding to a transition that may occur following the compared reference model information;

verifying output information in the acquired state of the reference model information and the output information output from the object, on the condition that the object is executed; and estimating a role of the object based on the reference model information in accordance with a result of the verification.

2. The method for obtaining accessibility information according to claim 1, further comprising the step of, in accordance with a positional relationship between the object and a text object displayed in the vicinity of the object, estimating alternative text representing the object using the text object, wherein, in the outputting step, the estimated alternative text is output as the accessibility information.

3. The method for obtaining accessibility information according to claim 2, wherein, in the step of estimating the alternative text, the alternative text is estimated in accordance with symbol information allocated to the object, the symbol information being obtained from a program forming the content, on the condition that the object is executed in the experimental environment.

4. The method for obtaining accessibility information according to claim 1, further comprising the steps of:

on the condition that the alternative text is not estimated, measuring a size of the object;

if the measured size of the object satisfies a predetermined dimension, judging a role of the object; and in accordance with a result of the judgment, cancelling the estimation concerning the role of the object.

5. The method for obtaining accessibility information according to claim 2, further comprising the step of measuring a size of the object,
wherein, in the step of estimating the alternative text, if the size of the object is zero, the text object satisfying the following Expression 1 is estimated as the alternative text, and
if the size of the object is not zero, the text object satisfying the following Expression 2 is estimated as the alternative text,

[Expression 1]

W: object
t: as text object
with respect to For t ∈ Text(Succ(Parent(W)))
(Dist(W, t) < $K_d$ × Diag(t)) ∩ (Left(W)) < Left(t)) ∩ (Top(W) > Top(t))
where
Text(nodes): among a node set nodes, a set of text objects
Succ(node): a set of descendants of node
Parent(node): a parent node of node
$K_d$: constant concerning overlapping and distance
Dist($o_1$, $o_2$): distance between objects $o_1$ and $o_2$
Diag(obj): length of diagonal line of object obj
Left(obj): coordinate at left end of object obj, where left is 0 and right is positive
Top(obj): coordinate at upper end of object obj, where lower is 0 and upper is positive

[Expression 2]

$$\left(\frac{Area(t)}{Int(t, W)} > T_{text}\right) \cap \left(\frac{Area(W)}{Int(t, W)} > T_{widget}\right)$$

where
Area(obj): display area of object obj
Int($obj_1$, $obj_2$): overlapping area of $obj_1$ and $obj_2$
$T_t$, $T_w$: constant concerning overlapping and distance.

6. The method for obtaining accessibility information according to claim 1,
wherein the step of estimating the role further comprises the steps of:
saving the experimental environment before executing the object;
on the condition that an input of the object is sent out, recording a state of the object; and
after executing the object, restoring the experimental environment.

7. The method for obtaining accessibility information according to claim 1,
wherein the step of estimating the role further comprises the step of:
verifying whether the output information of the object executed contains the output information of the acquired reference model information or not.

8. The method for obtaining accessibility information according to claim 1, wherein the rich internet application is created.

9. A non-transitory computer readable storage medium tangibly embodying a computer readable program code having computer readable instructions which, when implemented, cause a computer to carry out instructions for obtaining accessibility information in a content of a rich internet application by a method comprising the steps of claim 1.

10. An accessibility information acquisition computer device in the content of a rich internet application, comprising:
an experimental environment control unit that controls an experimental environment in which an object of the content displayed on a display screen is executed;
a processor;
a reference model storage unit that stores reference model information prepared beforehand concerning a plurality of objects;
a role estimation unit that estimates, in accordance with output information output from the object on the condition that the object is executed and a state of the object, a role of the object using the reference model information stored in the reference model storage unit; and
an output unit that outputs the role of the object estimated by the role estimation unit as the accessibility information;
wherein the role estimation unit initializes the experimental environment;
records a state of the object;
compares the recorded state of the object and a state of the reference model information stored in the reference model storage unit;
acquires a state corresponding to a transition that may occur following the compared reference model information;
verifies output information in the acquired state of the reference model information and the output information output from the object on the condition that the object is executed; and
estimates a role of the object based on the reference model information in accordance with a result of the verification.

11. The accessibility information acquisition computer device according to claim 10, further comprising a visual information analysis unit that estimates, in accordance with a positional relationship between the object and a text object displayed in the vicinity of the object, alternative text representing the object using the text object,
wherein the output unit outputs the alternative text estimated by the visual information analysis unit as the accessibility information.

12. The accessibility information acquisition computer device according to claim 11,
wherein the role estimation unit acquires symbol information allocated to the object from a program forming the content on the condition that the object is executed in the experimental environment; and
the visual information analysis unit estimates the alternative text of the object in accordance with the symbol information acquired by the role estimation unit.

13. The accessibility information acquisition computer device according to claim 11,
wherein the visual information analysis unit:
measures a size of the object on the condition that the alternative text is not estimated;
if the measured size of the object satisfies a predetermined dimension, judges a role of the object; and
in accordance with a result of the judgment, cancels the estimation concerning the role of the object.

14. The accessibility information acquisition computer device according to claim 11,
wherein the visual information analysis unit measures a size of the object, on the condition that the size of the object is zero, the text object satisfying the following Expression 3 is estimated as the alternative text, and on the condition that the size of the object is not zero, the text object satisfying the following Expression 4 is estimated as the alternative text, ---
[Expression 3]
---

W: object
t: as text object
with respect to For t ∈ Text(Succ(Parent(W)))
Dist(W, t) < $K_d$ × Diag(t)) ∩ Left(W) < Left(t)) ∩ (Top(W) > Top(t))
where
Text(nodes): among a node set nodes, a set of text objects
Succ(node): a set of descendants of node
Parent(node): a parent node of node
$K_d$: constant concerning overlapping and distance
Dist($o_1$, $o_2$): distance between objects $o_1$ and $o_2$
Diag(obj): length of diagonal line of object obj
Left(obj): coordinate at left end of object obj, where left is 0 and right is positive
Top(obj): coordinate at upper end of object obj, where lower is 0 and upper is positive ---
[Expression 4]
---

$$\left(\frac{Area(t)}{Int(t, W)} > T_{text}\right) \cap \left(\frac{Area(W)}{Int(t, W)} > T_{widget}\right)$$

---
-continued

[Expression 4]
--- where
Area(obj): display area of object obj
Int($obj_1$, $obj_2$): overlapping area of $obj_1$ and $obj_2$
$T_t$, $T_w$: constant concerning overlapping and distance.

15. The accessibility information acquisition computer device according to claim 11,
wherein the role estimation unit saves the experimental environment before executing the object;
on the condition that an input of the object is sent out, records a state of the object; and
after executing the object, restores the experimental environment.

16. The accessibility information acquisition computer device according to claim 10, wherein the output unit is an internal model.

17. The accessibility information acquisition computer device according to claim 10, wherein the accessibility information output from the output unit can be output as voice information.

18. The accessibility information acquisition computer device according to claim 11, further comprising a log analysis unit that analyzes log information output from the visual information analysis unit and the role estimation unit, wherein the output unit outputs the accessibility information using a result of the analysis by the log analysis unit.

* * * * *